United States Patent [19]
König et al.

[11] 4,211,492
[45] Jul. 8, 1980

[54] DOUGH PORTIONING MACHINE

[75] Inventors: Helmut König; Karl Schnider, both of Graz, Austria

[73] Assignee: Maschinenfabrik Dipl. Ing. Helmut König, Austria

[21] Appl. No.: 903,133

[22] Filed: May 5, 1978

[30] Foreign Application Priority Data
May 6, 1977 [AT] Austria .................. 3264/77

[51] Int. Cl.² ............ A21C 5/00; A21C 7/00
[52] U.S. Cl. .................. 366/76; 222/272; 222/281; 366/41; 366/181
[58] Field of Search ............ 366/76, 41, 181; 222/272, 281

[56] References Cited
U.S. PATENT DOCUMENTS
3,785,623  1/1974  König .................. 366/76

FOREIGN PATENT DOCUMENTS
209264  5/1960  Austria .................. 222/281

*Primary Examiner*—Stanley N. Gilreath
*Attorney, Agent, or Firm*—Holman & Stern

[57] ABSTRACT

Dough to be portioned is filled into a hopper, which leads to a chamber from which the dough is forced by means of a plunger into pocket openings arranged on the circumference of a rotating drum. Two rotary members are arranged in the hopper, each of which carries arms serving for preportioning the dough. Within the hopper and above the rotary members are arranged two sets of feed rollers for the dough. These feed rollers serve as intake rollers for the dough to be preportioned. The direction of rotational movement of the rollers of each set of feet rollers is the same as the direction of rotation of the cooperating rotary member. Rotation of the rotary members is controlled by a sensing means responsive to the quantity of dough in the chamber and also the rotation of the feed rollers may be controlled by these sensing means.

13 Claims, 3 Drawing Figures

DOUGH PORTIONING MACHINE

BACKGROUND OF THE INVENTION (1) Field of the Invention

The present invention refers to a machine for making dough portions of the type comprising a hopper from which dough is fed to a chamber in which a plunger operates to expel successive dough portions from the chamber. In the field of portioning dough, as it is used for example for making rolls or the like, it is of importance that each portion of dough has an exactly predetermined quantity. Furthermore, experience has shown that a device of the kind indicated above sometimes has the disadvantage that the dough in the hopper is subjected to a too strong movement, which may have a detrimental influence upon the dough. Furthermore, there is sometimes the disadvantage that a column of dough remains in the hopper and does not proceed to the chamber so that the plunger effects a void stroke or delivers dough portions having a dough weight considerably less than the predetermined value. However, it may also happen that too much dough enters the chamber guiding the plunger. This may cause the disadvantage of squeezing the dough and there are many different kinds of dough, which are very sensitive to such a squeeze.

(2) The Prior Art

One machine of several known embodiments comprises a particularly funnel-shaped, filling hopper for the dough, which hopper opens into a chamber from which the dough, by means of a plunger, is supplied to at least one receiving opening conducted past said chamber and arranged on a rotatably supported portioning drum, said receiving opening effecting in cooperation with a stripping edge the proper portionmaking operation. Within the filling hopper there are two star rollers rotatably supported for being unvariably rotated in opposite direction, the drive for said star rollers being controlled by a sensor supervising the amount of dough contained within said chamber. Such a device is known from U.S. Pat. No. 3,785,623 granted to Helmut König, and operates substantially in a satisfactory manner. However, practice has shown that when using filling hoppers of vast space, the star rollers cannot transport a sufficient amount of dough when handling certain types of dough. The use of filling hoppers of vast space is, however, desired for achieving a rapid operation when producing a greater number of dough portions.

SUMMARY OF THE INVENTION

Therefore, it is an object of the invention to secure the delivery of dough into said chamber also when using big filling hoppers and when using any type of dough, noting that this shall be effected with a simple constructional expenditure and in a dough sparing manner. This object is, according to the invention essentially achieved in that, upstream of said pair of star rollers a set of intake rollers driven for rotation is provided at the area of the walls of the filling chute and in that the direction of rotational movement of the intake rollers of each set of intake rollers is the same as is the direction of rotation of the cooperating star roller, noting that said rotational movement of the intake rollers is timely overlapping the rotational movement of the cooperative star roller. Thus the dough is supplied to the star rollers by means of said both sets of intake rollers, and the dough can reliably be supplied with a low constructional expenditure and, further, the dough is gently handled particularly when the rotational movement of the star rollers is coordinated to the rotational movement of the intake rollers such that all of these rollers are, at least for a certain time span, simultaneously rotated. It is just with filling hoppers of big space that by the features mentioned the dough can reliably be prevented from forming a bridge above the star rollers, which bridge would prevent the dough from becoming seized by the star rollers and would result in view of a shortage of dough within the chamber in the production of void portions or underweight portions. Both are highly undesired because void portions (no dough at all portioned) would make the subsequent working steps irregular and underweight portions would be the cause of objections.

The constructional expenditure for a device according to the present invention is less because in most cases only one single sensor is required, which can be used for controlling the intake rollers as well as the star rollers. Above all, the dough is sparingly manipulated because it is gently lifted off the walls of the filling hopper by means of the intake rollers (preferably at least three of which are, according to the invention, arranged in each set of rollers) and is reliably supplied to the star rollers and because the dough is reliably seized and drawn off by the star rollers and portionswise supplied to the pusher- or plunger chamber. The star rollers, effecting a dough portion making operation, cooperate in the transport of the dough which is initiated by the intake rollers, and this cooperation is effective particularly when all rollers are simultaneously rotated for at least a certain time span. In this case it is not compulsory that the intake rollers and star rollers being intermittently driven in dependence on the sensor have the same starting moment or the same stop moment of their respective rotational movements because it is, within the scope of the present invention, sometimes more favourable to rotate the intake rollers for a longer period than the star rollers. From the standpoint of the expenditure required for the control of operation, the arrangement, in which the star rollers and the intake rollers are exactly rotating during the same period, is the most favourable arrangement, however it is, considering the delivery of the dough, more favourable to rotate the intake rollers for a short time after having stopped the star rollers because this manner of operation results in the advantage that the intake rollers are still supplying the dough in direction to the star rollers and, respectively, to the void space produced by the arms of the star rollers.

According to the invention, the intake rollers of each set are arranged immediately adjacent. Preferably the intake rollers contact one another at their circumference. This provides a self-cleaning property of the intake rollers because the intake roller located at a lower level will remove any dough residue from the intake roller located immediately above. Thus, the intake rollers need only be rarely be cleaned. This becomes the more true the smaller is the gap between adjacent intake rollers.

According to a preferred embodiment of the invention, the two sets of intake rollers are forming a dough intake gap converging in direction to the two star rollers, noting that the intake rollers located at a lower level are rotated with a higher circumferential velocity than the intake rollers located at a higher level. The reason therefor is that in view of the dough intake gap becoming narrower in direction to the star rollers, the same amount to be supplied corresponds to a shorter conveying distance in the upper levels of the dough intake gap than in the lower levels of the dough intake gap. By increasing the circumferential velocity of the intake rollers in downward direction, removal of residual dough from the intake roller located at the next higher level is promoted. It is, however, possible to rotate all rollers with the same circumferential velocity.

Experience has shown that for most types of dough, the most favourable dough intake values can be obtained when the intake rollers are arranged in pairs at one and the same level and the axes of the rollers of both sets are located on lines which are more diverging at a higher level than at a lower level. The axes of the intake rollers may be arranged on curves diverging in upward direction, it is, however, more simple and also sufficient to arrange, for constructional reasons, the axes of the intake rollers of each set along two intersecting straight lines, the lower of said both straight lines being more inclined than the upper one of said both straight lines. The most favourable values are, according to the invention, obtained if the axis of the lowermost intake roller of each set is located on a line extending that arm of the adjoining star roller which follows the arm of said star roller which is directed to the axis of the other star roller. The star rollers are cutting off dough portions which, as a rule, is effected if one arm of each star roller is directed in direction to the axis of the other star roller.

From constructional reasons it is convenient that, according to the invention, all intake rollers have the same diameter, which is preferably smaller than twice the radial length of the arms of the star roller. These values have proved favourable for a sparing and reliable intake of dough in direction to the star rollers.

For facilitating the dough to become lifted off the walls of the filling chute and transferred onto the uppermost intake roller at least the uppermost intake roller of each roller set may have a corrugated surface. With some types of dough however, it is preferable to use rollers having a smooth surface since these can be cleaned more easily than a corrugated roller. For facilitating cleaning of the star rollers and at least the lower intake rollers a retractable member is, according to the invention, provided within the filling hopper at an area between the star rollers and the chamber.

The invention is further illustrated with reference to the annexed drawing showing a non-limiting embodiment of the device according to the invention.

BRIEF DESCRIPTION OF THE DRAWINGS

The invention will be further explained by describing a preferred ambodiment with reference to the accompanying drawing in which.

DESCRIPTION OF THE PREFERRED EMBODIMENT

Figure 1:
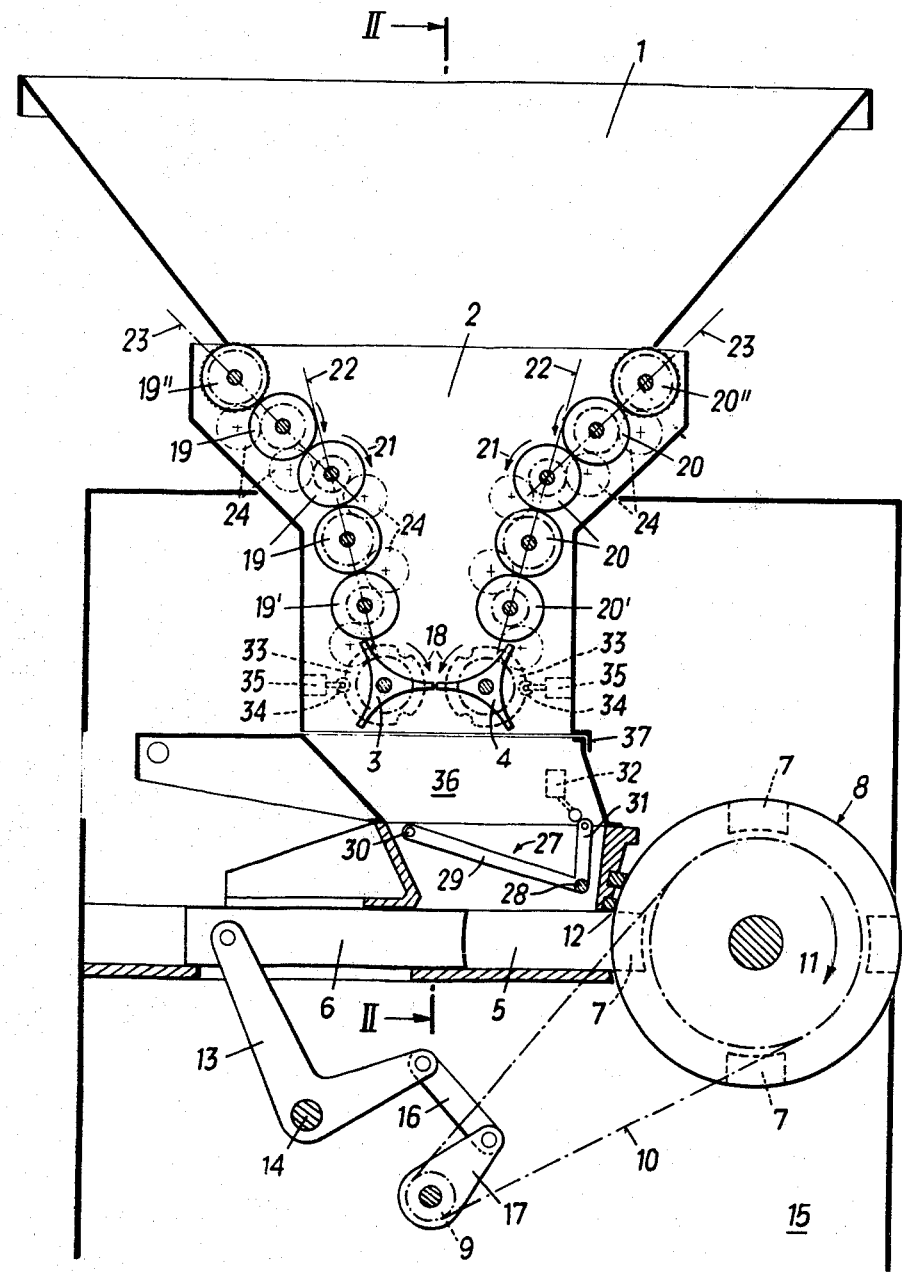
FIG. 1 represents a vertical section through the machine along a plane extending perpendicular to the roller axes.
Figure 2:
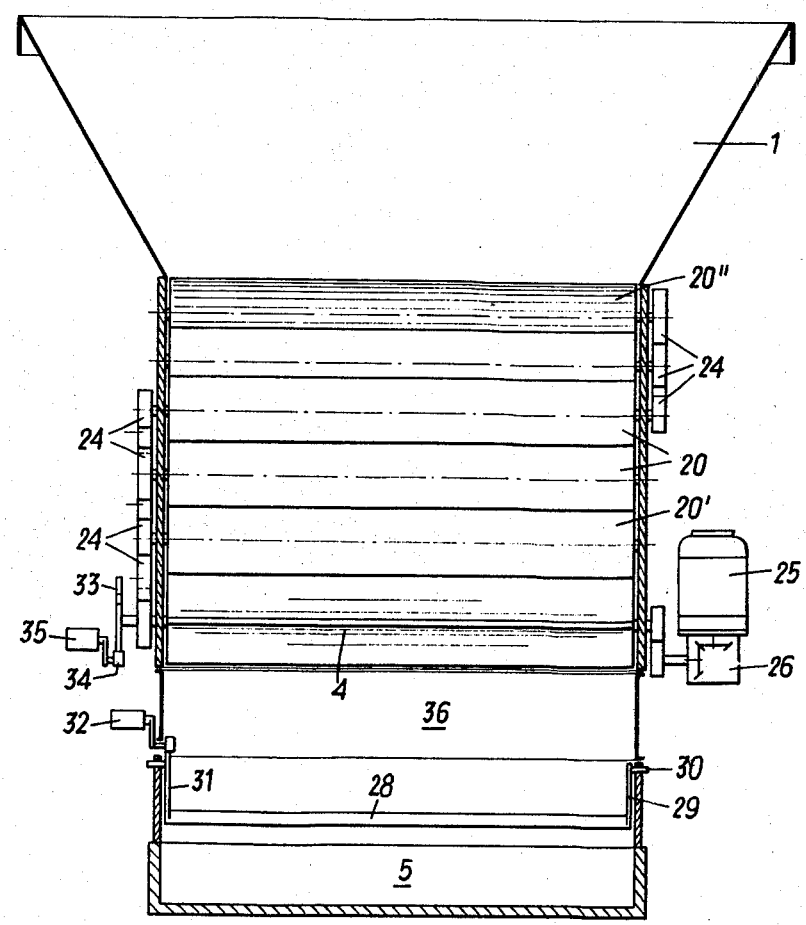
FIG. 2 represents in an enlarged scale a section along line II—II of FIG. 1 and, FIG. 3 is a view similar to FIG. 2 showing an alternative drive arrangement for the rollers.

The machine shown in FIGS. 1 and 2 has a dough funnel or hopper 1, fixedly mounted to the frame of this machine and opening into a filling chute 2, at the lower end of which two star rollers 3, 4 are rotatably supported for performing with their arms a preliminary dough portion-making operation and for feeding the dough portions produced into a chamber 5 out of which the dough is pushed by a piston 6 into dough receiving openings 7 provided on the periphery of a portion-making drum 8 rotatably supported within the frame. The portion-making drum 8 is stepwisely rotated in direction of arrow 11 by means of a drive pinion 9 and a chain 10, whereby the dough pushed into the receiving openings 7 by means of the piston 6 becomes sheared off by a shearing edge 12. Thus, the portion-making operation proper is effected. Within the receiving openings 7 of the portion-making drum 8, the dough portions can be kneaded in a manner known per se, as it is shown for example in the U.S. Pat. No. 3,733,058 granted to Helmut König, and the dough portions can subsequently be transferred onto a conveyer, for example a conveying belt (not shown). The piston 6 is driven by a crank lever 13, which is pivotally connected to the piston 6 and is pivotally supported on an axis 14 provided within the housing 15 of the device. A link 16 is pivotally connected to the other arm of the crank lever 13 and connected to a crank arm 17 of the drive shaft 9. The conditions are selected such that the piston 6 is reciprocated once, i.e. once advanced and retracted, if the drum 8 is rotated for the circumferential distance of two adjacent receiving openings 7, i.e. one forth of a revolution.

Each of the rollers 3, 4 has three arms which draw the dough out of the filling chute 2 and cut portions from the dough strand supplied. These two star rollers 3, 4 are rotated in opposite directions with unvariable sense of rotation as is indicated by the arrows 18. This can be done by means as they are shown in the U.S. Pat. No. 3,785,623 granted to Helmut König. Above these two star rollers 3, 4, two sets of intake or feed rollers 19, 19', 19" and 20, 20', 20", respectively, are arranged adjacent the walls of the filling chute. The sense of rotation of each set of these rollers is the same as is the sense of rotation of the coordinated star rollers 3 and 4, respectively (arrows 21). The two lowermost intake or feed rollers 19' and 20', respectively, are arranged such, that their respective axis is approximately located in the virtual extension of the upwardly directed arm of the star roller 3 or 4, respectively, at the moment when the leading arm (as seen in the sense of rotation) of the star roller 3, 4 has just reached its horizontal cutting position. The lowermost intake rollers 19', 20' are arranged immediately adjacent the star rollers 3, 4 such that the arms of the star rollers 3, 4 can just pass these intake rollers 19', 20'. These intake rollers 19', 20' are thus kept free of any dough residue because any dough residue is wiped off these intake rollers by the arms of the star rollers 3, 4. In an analogous manner, the other intake or feed rollers 19 and 20, respectively, are arranged such that the individual rollers 19, 20 are contacting one another without any substantial friction. Thus, also these intake rollers are automatically kept clean. The axes of each set of intake rollers are arranged along two straight lines 22, 23 intersecting one another in the axis of the middle roller 19 or 20, respectively, noting that the lower straight line 22, which applies to the axes of the lower intake rollers, is steeper inclined than the straight line 23, which applies to the axes of the upper intake rollers. The intake rollers are rotated via gear wheels or pinions 24 and a gearing 26 by means of a motor 25 (FIG. 2). This drive means may be also used for rotating the star wheels 3, 4, as it is shown in FIGS. 1 and 2 by intermeshing pinions. The gearing ratios of the gear wheels or pinions are selected such that each intake roller arranged at a higher level is rotated with a lower circumferential velocity than the intake roller located just below. The intake rollers 19, 20 contribute to the conveying action of the star rollers 3, 4 and draw the dough into the filling chute 2. In view of the circumferential velocity of the intake rollers 19, 20 becoming greater for intake rollers located at a lower level, the fact is taken into consideration that the intake chute 2 is tapering in downward direction and thus one and the same amount of dough must be more rapidly moved at a lower level than at a higher level. In view of the relatively great number of rollers the dough is rolled down in a sparing manner within the intake chute. Not only the marginal areas of dough located near the intake rollers 19, 20 of the total amount of dough present in the dough funnel are fed in direction to the star rollers 3, 4 but also the wedge-shaped dough area located amidst these intake rollers 19, 20. The lower intake rollers arranged with their axes along the steeper inclined straight line 22 have a substantial conveying action on the dough so that the dough is reliably fed to the star rollers 3, 4 whereas the intake rollers arranged with their axes along the less inclined straight line 23 exert a supplying action on the dough. In view of the uppermost intake rollers being arranged relatively far one from the other, a cross section as broad as possible of the dough funnel 1 is acted upon by the intake rollers so that the dough comes into the area of action of the intake rollers 19, 20 already within the relatively broad area. The intake rollers need not be of equal size. However, from constructional reasons it is convenient to give the intake rollers an equal size. For facilitating lifting off of the dough from the wall of the dough funnel 1 the uppermost intake rollers 19" and 20", respectively, can have a corrugated surface.

Figure 3:
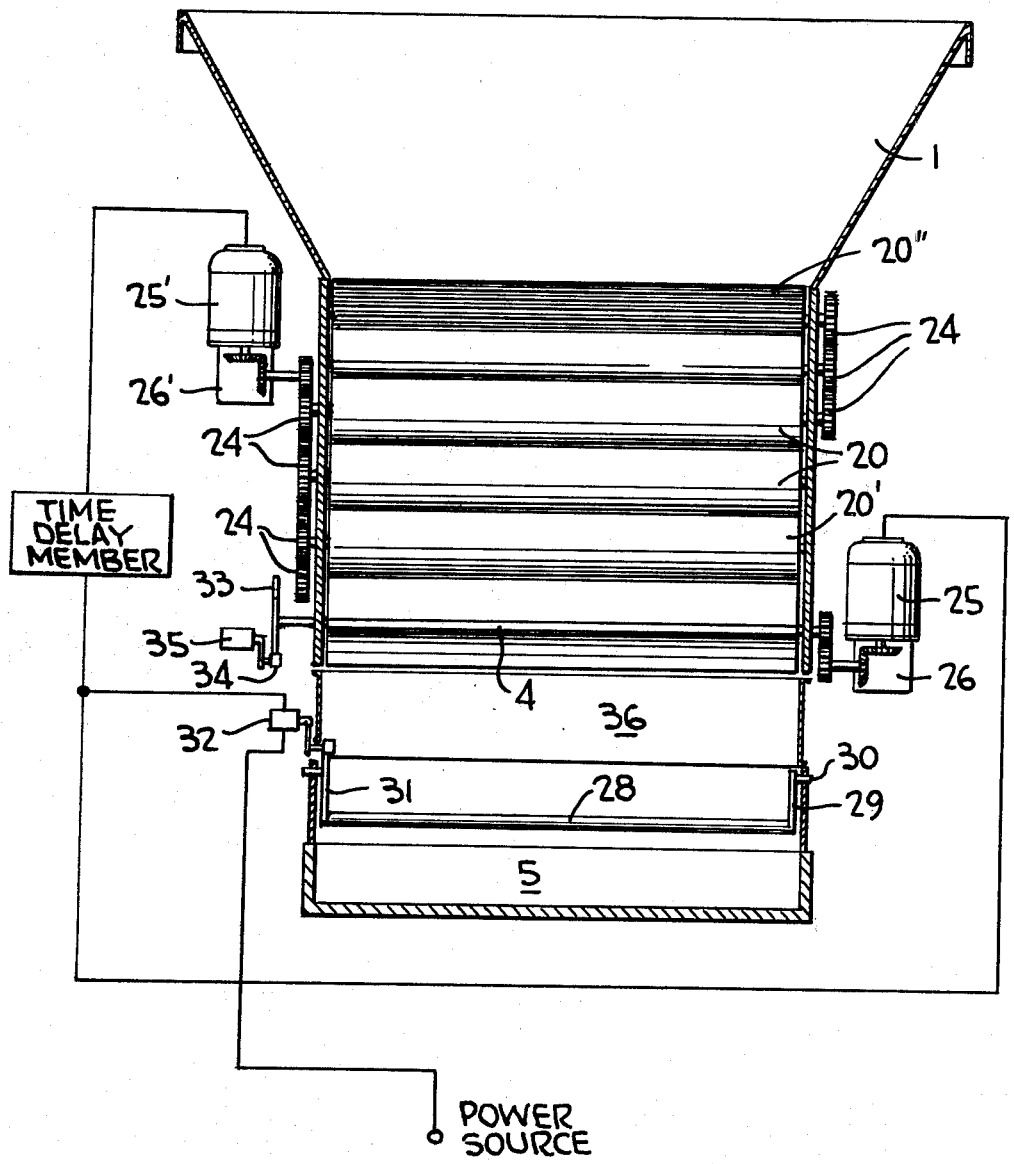

The intake or feed rollers 19, 20 and the star rollers 3, 4 are not continuously rotated. These rollers are intermittently rotated in dependence on the amount of dough present within the chamber 5. For this purpose a sensor 27 is provided which indicates of the amount of dough present within the chamber 5. This sensor 27 comprises a rod 28 extending over the width of the chamber 5 as measured in direction of the axis of the drum 8. This rod 28 is laterally supported on levers 29 which are pivotally supported around pivotal pins 30 on the walls of the chamber 5. This sensor 27 is acting via a latch 31 on a switch 32 which is deenergizing the motor or other drive means (not shown) for the star rollers 3, 4 as well as for the intake rollers 19, 20 as soon as the amount of dough present in the chamber 5 is sufficient for sufficiently lifting the sensor 27 when the advancing pusher 6 is displacing part of the dough in upward direction. Under this condition, the star rollers 3, 4 are, however, always further advanced by rotation into a position in which one of their arms is horizontally extending in direction to the center of the intake chute and in direction to the oppositely directed arm of the other star roller so that these two arms of both rollers 3, 4 obstruct the intake chute and no dough can flow in downward direction. This is achieved by providing on the shaft of each star roller 3, 4 a notched disc 33 the notches of which are engaged by a feeler 34, noting that number and distribution of the notches is equal to number and distribution of the arms of the star rollers. The feeler 34 engaging notches is deenergizing the drive means for the star rollers 3, 4, so that these star rollers 3, 4 are always only rotated for an angle included by two adjacent arms. As soon as the star rollers are rotated, also both sets of intake rollers 19, 20 are rotated in the indicated sense of rotation. If the rotation of the intake rollers 19, 20 is derived via gear wheels from the rotation of the star wheels 3, 4, the intake rollers 19, 20 are rotated exactly as long as are rotated the star rollers 3, 4 as shown in FIG. 2. If desired, a separate control or a separate drive means for the intake rollers 19, 20 can be provided in such a manner that the intake rollers 19, 20 are still rotated for a short time span after rotation of the star rollers 3, 4 has been stopped. This can, for example, be achieved in that the deenergization, initiated by the feeler 34, of the drive means for the star rollers 3, 4, is only allowed after a predetermined time lag to become effective for the deenergization of a drive means for the intake rollers 19, 20. For this purpose, for example, (as shown in FIG. 3) a time delay member, for example a RC-member can be used, which is interconnected into the electric power supply of the drive means 25', 26' for these intake rollers 19, 20. Circuit members suitable for this purpose can be incorporated either in the switch 32 as shown in the drawing or into the switch 35 cooperating with the sensor 34. Another way to achieve the desired delay in stopping the two sets of feed or intake rollers is to use clutches or magnetic couplings for these rollers, as it is described in the above mentioned U.S. Pat. No. 3,785,623 to Helmut König.

For facilitating cleaning of the star rollers 3, 4 and at least the lower intake rollers 19, 20 as well as the chamber 5 and the pusher 6, part of the walls of the intake chute 2 and of the chamber 5, respectively, can be designed as a retractable member 36, whereas the other walls of the dough funnel 1, of the intake chute 2 and of the chamber 5 are fixedly mounted to the frame 15. The retractable member 36 can be retracted for cleaning purposes and can be reintroduced until engaging an abutment 37 after having finished the cleaning operation.

The number of pairs of intake rollers depends on the dimensions of the dough funnel. Therefore, if desired, more than five or less than five of such pairs of intake rollers can be provided. For establishing symmetrical conditions, it is recommended to arrange the intake rollers 19, 20 so that always one pair of such rollers is at the same level. The operation of the machine is as follows:

The dough is filled into the hopper 1 and into the filling chute 2 and the machine is set in operation by actuating a starting switch (not shown). Thus the drive means for the drum 8 and for the plunger 6 are so actuated that the drum 8 is rotated stepwise around its horizontal axis. The plunger 6 is reciprocated and pushes dough into the openings 7 of the drum 8. This dough is fed into the chamber 5 by means of the arms of the rotary members 3, 4 which are rotated as long as there is no sufficient amount of dough present in the chamber 5. This is monitored by the sensor 27. At the same time at which the rotary members 3, 4 start to rotate, the feed rollers 19, 20 are also rotated by means of the intermeshing pinions shown. When there is the predetermined value of dough present in the chamber 5, the feeler or sensor 27 is so actuated, that the switch 32 is actuated which, if desired, with a certain delay, stops rotation of the rotary members 3, 4 and, at the same time or, if desired, also with a certain delay, rotation of the feed rollers 19, 20. The drum 8, however, is continued to be stepwisely rotated, so that by and by the dough from the chamber 5 is pressed into the pocket 7. Thus the amount of dough in the chamber 5 is so decreased that the sensor means 27 is so actuated that the motor for driving the rotary members 3, 4 and the feed rollers 19, 20 is energized anew. Thus, the amount of dough in the chamber 5 is always kept between two predetermined values, namely, a maximum value at which the feeler 27 stops the rotation of the rotary members 3, 4, and a minimum value, at which the feeler 27 switches in this rotation.

As already indicated, the rotation of the feed rollers 19, 20, however, can also be controlled by a second feeler responsive on the amount of dough near the rotary members 3, 4, for example by means of an optical feeler (not shown).

We claim:

1. A dough portioning machine, comprising a machine frame, a drum rotatably mounted in said frame, a dough supply station having a hopper to supply the dough to a chamber forming a dough reservoir, pocket openings arranged on the circumference of said drum to receive the dough from said chamber, a plunger means guided in said chamber and serving for feeding the dough into said pocket openings, a first drive means for imparting a stepwise rotating movement to said drum, a second drive means for imparting a reciprocating movement to said plunger, a preportioning means arranged within said hopper and having two rotary members rotatably mounted on horizontally disposed axes, each of said rotary members having arms on its circumference for cutting off the dough and for feeding same into said chamber, a third drive means for imparting a unison rotational movement with the same angular velocity but in opposite directions to said rotary members, two sets of feed rollers arranged in said hopper above said rotary members, and defining an intake gap between the respective sets, said gap tapering towards said rotary members, one of said feed roller sets being disposed near a side wall of said hopper with the axes thereof being parallel to and above the axis of one of the rotary members, the other of said feed roller sets being disposed near an opposite side wall of said hopper with the axes thereof being parallel to and above the axis of the other of the rotary members, a fourth drive means for imparting a rotational movement to all of the feed rollers, the fourth drive means being arranged to drive the feed rollers of the one set in the opposite direction to the feed rollers of the other set, the direction of rotation of each set of feed rollers being the same as that of the rotary member arranged below the respective set, a dough sensing means responsive to the quantity of dough in said dough reservoir and connection means between said sensing means and said third and fourth drive means for operating said third and fourth drive means responsive to signals received from said sensing means to control the quantity of dough in said dough reservoir.

2. A machine as claimed in claim 1, wherein said third and fourth drive means comprise means for rotating said rotary members and said feed rollers intermittently in such a manner that the feed rollers and the rotary members are rotated simultaneously at least for a part of their rotation.

3. A machine as claimed in claim 2, including time delay means in said connection means between said sensing means and said fourth drive means for terminating operation of said fourth drive means subsequent to termination of the operation of said third drive means whereby the rotational movement of the feed rollers exceeds the rotational movement of the rotary members.

4. A machine as claimed in claim 2, including a drive connection between said third and fourth drive means whereby the rotational movement of the feed rollers and of the rotary members starts and stops at the same time.

5. A machine as claimed in claim 1, wherein the feed rollers of each set are disposed immediately adjacent each other and contact each other with their circumferences.

6. A machine as claimed in claim 1, further comprising means for rotating the feed rollers located at a lower level with a higher circumferential velocity than the feed rollers located at a higher level.

7. A machine as claimed in claim 6, wherein the feed rollers are arranged in pairs at the same level and in that the axes of both sets of intake rollers are arranged along lines which are more divergent at a higher level than at a lower level.

8. A machine as claimed in claim 7, wherein the axes of the feed rollers of each set are arranged along two intersecting straight lines, the lower one of which has steeper inclination than the upper one.

9. A machine as claimed in claim 1, wherein the axes of the lowermost feed roller of each set is substantially located in the extension of that arm of the adjacent rotary member which follows that arm of said rotary member which is directed to the axis of the other rotary member.

10. A machine as claimed in claim 1, wherein all feed rollers have the same diameter.

11. A machine as claimed in claim 10, wherein said diameter is smaller than twice the radial length of an arm of the rotary member.

12. A machine as claimed in claim 1, wherein at least the topmost feed roller of each set is provided with a corrugated surface.

13. A machine as claimed in claim 1, further comprising a retractable member provided within the hopper and between the rotary members and the chamber for cleaning the rotary members and at least the lowermost feed rollers.

* * * * *